Sept. 20, 1966 G. B. STRAWBRIDGE 3,274,562
MEMORY APPARATUS WHEREIN THE LOGICAL SUM OF ADDRESS AND DATA IS STORED AT TWO ADDRESSABLE LOCATIONS
Filed Jan. 30, 1963
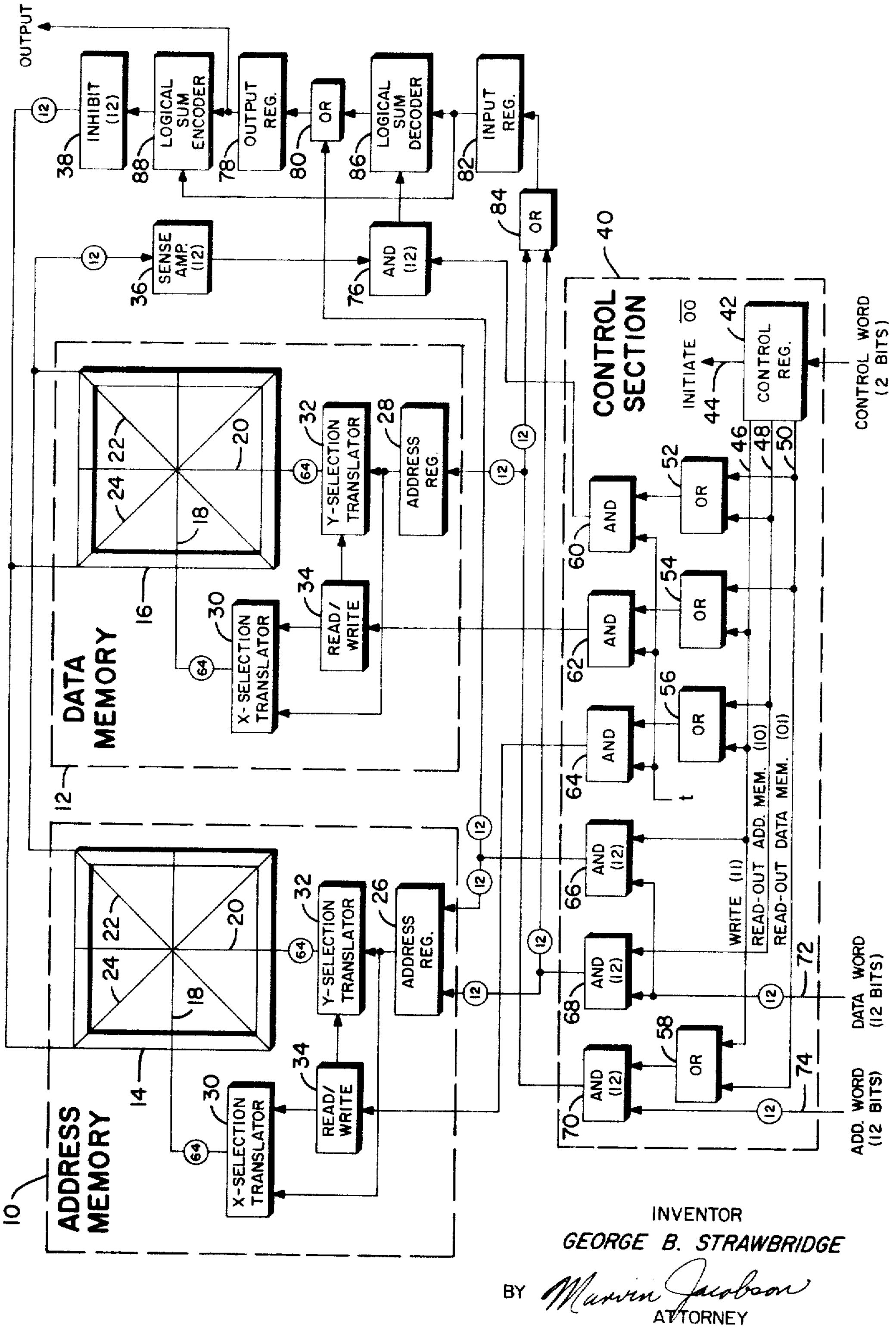
INVENTOR
GEORGE B. STRAWBRIDGE
BY Marvin Jacobson
ATTORNEY United States Patent Office 3,274,562

Patented Sept. 20, 1966

3,274,562

MEMORY APPARATUS WHEREIN THE LOGICAL SUM OF ADDRESS AND DATA IS STORED AT TWO ADDRESSABLE LOCATIONS

George B. Strawbridge, St. Paul, Minn., assignor to Sperry Rand Corporation, New York, N.Y., a corporation of Delaware Filed Jan. 30, 1963, Ser. No. 254,986

5 Claims. (Cl. 340—172.5)

This invention relates generally to random access memory devices in electronic digital data processing apparatus. More particularly, this invention is directed toward new and improved means for referencing addressable memory locations in storing and reading-out binary coded information for data processing.

Since the preferred embodiment of this invention will be described in combination with a random-access coincident-current magnetic core memory, the latter now will be briefly described. This type of memory is well known in the art and contains, as the basic storage element, bistable magnetic cores, each having a substantially rectangular hysteresis loop. In a typical arrangement a planar array of 64 rows and 64 columns of 4,096 cores has separate drive lines for each of the rows and columns, hereinafter referred to as X and Y drive lines respectively, which are selectively enabled by current pulses applied thereto to select one of the cores. One planar array of this type can be considered as storing single-bit binary words at 4,096 different addressable locations. In general, a large scale memory device contains a plurality of planar arrays corresponding to the word size. For example, a memory for storing twelve-bit words at 4,096 addressable locations contains twelve planar arrays.

Assuming that information has been initially stored in the memory, to read-out this information an address word is placed in the address register of the memory and translated into X and Y coordinates to select one of the X and one of the Y drive lines. A memory reference cycle is initiated to apply current pulses to the selected X and Y lines to cause a signal to be developed on a sense line which is inductively coupled to all of the cores on the array. This signal is a manifestation of the binary information, "0" or "1," which had been previously stored in the selected core. The signal passes from the sense line to output means which stores it temporarily and transmits it to a utilization device. The memory reference cycle also includes a restore step to rewrite the information in the selected core from which it had been read-out. To write or store new information into the memory, the same address selection means are used and the reference cycle initiated. However, during the read-out portion the information read-out is not allowed to pass to the output means and the new information is written into the selected cores during the restore portion of the memory reference cycle. In general then, it can be seen that data or information stored into or read-out from a memory has an associated address word.

In some data processing applications, it has been found necessary and advantageous to store information at two locations in the memory so that if the memory address alone is known the associated data word can be determined and, alternatively, if only the data word is known the associated memory address can be determined. To incorporate the desired feature in a conventional memory of the type described above, two memory reference cycles would have to be initiated with time allowed between the cycles to allow a change in the contents of the address register. It is a general object of this invention to provide a random-access memory for binary information in which predetermined information is stored at two different addressable locations.

It is a further object of this invention to achieve the immediately foregoing object with no increase in memory reference cycle time.

In the preferred embodiment of this invention, given a particular data word which is to be stored in a memory register located at an address designated by an associated address word, two separate random-access memory devices of the conventional type described above are provided. Each of said memory devices has its own address register, X and Y translators, read/write circuitry for providing current pulses to the respective drive lines and sense lines. Prior to the initiation of the memory reference cycle, the data word and the address word are combined in an encoder which provides output signal manifestations of the logical sum of the two words. The address word is placed in the address register of one of the memory devices, and the data word is placed in the address register of the other memory device. The memory reference cycles of both are initiated concurrently and the developed logical sum signal manifestations are stored at the respectively designated addresses of the two memory devices. The two memory devices can be referred to as an address memory and a data memory respectively with the latter storing the logical sum at an address designated by the address word and the former storing the same logical sum at an address designated by the data word. To subsequently obtain the data word from the known address word, the logical sum is read-out of the data memory from the memory location designated by the address word, and the address word is combined with the read-out information in a decoder to provide a further logical sum. The latter is the data word. In a similar manner, with a known data word the address memory is referenced at a location designated by the data word. The previously stored logical sum and the data word are combined in the decoder to provide the address word. A feature of this invention is that even though two separate memory devices are used, they are able to share common output circuitry, therefore, duplication of all circuits is not required.

As a further feature of this invention, it should be noted that if a plurality of different data words are to be associated with a single address word, one of the memory devices will contain a logical sum which, when combined with the address word, will produce the latest data word associated with that address while the other memory device will contain different logical sums at a plurality of address locations which, when combined with their corresponding data words, will produce the same address word. The converse is true when a plurality of different address words are associated with a single data word.

These and other more detailed objects and features will be disclosed in the course of the following detailed description with reference to the single figure.

In the figure, there is shown enclosed by dashed lines two memory devices, 10 and 12, referred to as the Address Memory and Data Memory, respectively. These memory devices are identical to one another and since their internal operations are not considered a part of this invention, no detail of the internal structure is shown and only those areas considered helpful in understanding this invention are symbolically shown. For illustrative purposes, only a single planar array for each of the memory devices is indicated at 14 and 16, respectively. Each of these arrays include 4,096 bistable magnetic cores, not shown, arranged in 64 columns and 64 rows with a different X Drive Line, 18, for each of the rows and a different Y Drive Line, 20, for each of the columns. A single Sense Line, 22, and a single Sense Line, 24, are inductively coupled to all of the cores in each of the planar arrays. A planar array of this nature can be considered as providing storage of single-bit words at 4,096 addressable locations. To achieve storage capabilities of greater capacity, that is to handle larger size words such as twelve-bit words, eleven additional identical planar arrays would be provided and would extend in the Z direction, that is into the paper. This would provide twelve-bit storage registers at 4,096 addressable locations.

The Address Memory and the Data Memory each have an Address Register, respectively 26 and 28, which include means for receiving a binary-coded word and means for holding, at least temporarily, the word which designates a particular address in the corresponding memory. Typically, for 4,096 addresses, the Address Register has twelve bistable stages, each stage holding the signal manifestation of a corresponding digit order of a binary-coded word. Signal manifestations of the words, in the Address Registers are transmitted to the respective X and Y selection Translators, 30 and 32, which translate the word contained in the Address Register to activate one of the 64 X Drive Lines and one of the 64 Y Drive Lines. The Read/Write circuitry, shown by block symbol 34, when initiated provides current pulses of the proper polarity and magnitude to the selected X and Y Drive Lines to effect the read and restore steps in a memory reference cycle in correct sequence.

Typical operation of one of the memory devices will now be briefly described. A twelve-bit binary-coded word is placed in the Address Register and is transmitted to the X and Y Translators to activate a single X and Y Drive Line in each of the twelve planar arrays. The Read/Write circuitry is activated and current pulses are applied to the selected X and Y Drive Lines to cause a selected magnetic core in each of the twelve arrays to produce a signal indication of the binary value of the digit stored therein, a "0" or a "1," on the corresponding Sense Line. The twelve Sense Lines are coupled to the inputs of respectively corresponding Sense Amplifiers, 36, to provide amplified output signal manifestations of the twelve bits of information read-out of the memory. Since it is assumed, for illustrative purposes, that the read-out step destroys the stored information in the selected memory storage register by clearing the selected cores, the information must be written back in the same location. This is effected by placing into the twelve Inhibit Drivers, 38, signal manifestations of the read-out information. Signal representations of the binary value of each of the digits read-out are applied to each of the respectively corresponding Inhibit Lines in a manner such that where a "0" is to be written an inhibit current pulse occurs to balance out one of the current pulses on the selected X and Y Drive Lines so that the selected core remains in the clear condition, whereas when a "1" is to be rewritten no inhibit current pulse occurs and the current pulses on the selected X and Y Drive Lines set the selected core to a state representative of a binary "1." Since in this invention information can be read-out of only one of the memory devices at any given time, the two memory devices share a single set of Sense Amplifiers and Inhibit Drivers. Even though, in this invention, new information is written into both of the memory devices at the same time since it is the same information which is written into both memory devices, the Inbibit Drivers can be shared.

Refer now to the Control Section 40 shown enclosed by dashed line. A Control Register, 42, receives a two-bit control word and decodes this word to selectively apply a signal to initiate line 44 and one of the three output lines, 46, 48, and 50. The Control Register is typically a two-stage register for receiving the two-bit control word and includes logic means for activating one of the output lines and the initiate line in accordance with three of the four possible binary combinations of the two input bits. The Control Register recognizes the fourth combination as not stimulating a memory reference. OR circuits 52, 54, 56, and 58 are of the type well known in the art and provide a signal output when any of their inputs as active. OR circuit 52 receives inputs from lines 48 and 50, OR circuit 54 receives inputs from lines 46 and 50, OR circuit 56 receives inputs from lines 46 and 48, and OR circuit 58 receives inputs from lines 46 and 50. AND circuits 60, 62, and 64 are two-input AND circuits of any type well known in the art and provide outputs when both inputs are active. Each of these latter AND circuits have one input labelled "*t*" which provides a timing pulse from means not shown and have a second input from the respective OR circuits 52, 54, and 56. Although ANDS 66, 68, and 70 are indicated by single block symbols in the conventional manner, they are actually intended to each represent twelve separate two-input AND circuits. Each of the twelve ANDS at 66 receive a first input from line 46 and a second input from Data Word Line 72 which transmits, in parallel, the twelve bits of the data word. The AND circuits at 68 each receive a first input from line 48 and a second input from a respectively different one of twelve data word bits. The twelve AND circuits at 70 each receive a first input from OR circuit 58 and a second input from a respectively different one of the twelve bits transmitted on the Address Word Line 74.

The output of AND 60 provides a first input to each of twelve AND circuits represented by block 76. The output of AND 62 provides an input to Read/Write circuit 34 of the Data Memory to activate the latter when both inputs to AND 62 are present while, in a similar manner, the output of AND 64 provides an input to the Read/Write circuitry 34 of the Address Memory to activate the latter when both inputs are present to AND 64. The outputs of the twelve ANDS represented by 66 are transmitted to the Address Memory Address Register 26 and to the Output Register 78 via OR 80. When an input is present at the ANDS 66 from the Control Register output line 46, data words present on the Data Word Input Lines 72 are transmitted to the latter two registers. The output of ANDS 68 is transmitted to Address Memory Address Register 26 and to the Input Register 82 via OR 84. When the Control Register output line 48 is active, signal manifestations of the twelve bits of the data word on line 72 are transmitted via AND 68 to registers 26 and 82. The outputs of ANDS 70 are transmitted to the Data Memory Address Register 28 and to the Input Register 82 via OR 84. When the ANDS 70 are enabled through OR 58 by Control Register output lines 46 or 50 being active, the twelve bits of the address word appearing on Address Word Input Lines 74 are transmitted to the Data Memory Address Register 28 and Input Register 82.

Input Register 82 can be of any type well known in the art and typically is a twelve stage temporary storage register with each stage corresponding to a respectively different digit order position of a twelve-bit binary word. Signal manifestations of the contents of the Input Register are transmitted to the Logical Sum Decoder 86 and to the Logical Sum Encoder 88. The Decoder also receives inputs from the twelve AND circuits represented by 76 and the Encoder receives further inputs from the Output Register 78. The Output Register is preferably identical to the Input Register 82 and temporarily stores binary-coded twelve-bit words and provides signal manifestations of the words contained therein. The Encoder 88 and Decoder 86 are identical units, and they perform the function of developing signal manifestations of the logical sum of two binary input words. Logical summation is similar to a half-add in which the binary values of corresponding digit orders of two binary numbers are added together bit by bit without regard to the propagation of or accounting for carries. The following is an example:

(a) 1011
(b) 0110
(c) $\overline{1101}$=Logical Sum

For illustrative purposes the Encoder and Decoder can each be considered as comprising a set of twelve exclusive-OR circuits, one for each digit order of the two binary words to be summed. Exclusive-OR circuits are well known in the art and will produce a signal representative of a binary "1" if either input is a "1" but not if both are "1's." It can be shown that when two binary numbers are combined to provide their logical sum, this logical sum when logically summed with either of the first two binary words will produce a result which is equal to the other of the two binary words. For example, using the same binary valued numbers as in the example above, the logical sum of (c) and (a) equals (b). In a similar manner the logical sum of (c) and (b) is equal to (a). It can be seen then that the formation of a logical sum of two binary words provides a binary word which associates the two original words such that if either of the original two words is known, the other can be readily determined. It is also of interest to note that the same valued logical sum can be derived by combining different pairs of binary words. For example, the logical sum (c), equal to 1101, will result from the logical summation of 0100 and 1001 or from the logical summation of 1111 and 0010. Other combinations to achieve the same valued result are possible.

In general, there are three possible modes of operation of this invention which are respectively listed below as A, B, and C. Adjacent to each of the titled modes, enclosed by parenthesis, is the arbitrarily assigned coding of the two-bit control word. Listed under each of the modes of operation are the functional steps which are performed in the mode of operation. It is not intended that the order of listing necessarily indicates the sequence of occurrence of these steps.

(A) Write Operation (11).
- (1) Set Control Register to 11.
- (2) Transfer the address word to the Data Memory Address Register and to the Input Register.
- (3) Transfer the data word to the Address Memory Address Register and to the Output Register.
- (4) Activate the Address Memory and the Data Memory.
- (5) Develop the logical sum of the contents of the Input Register and the contents of the Output Register in the Encoder to control the inhibit lines.

(B) Read-Out Address Memory (10).
- (1) Set Control Register to 10.
- (2) Transfer the data word to the Address Memory Address Register and to the Input Register.
- (3) Activate the Address Memory.
- (4) Develop the logical sum of the word from the Sense Amplifier outputs and the contents of the Input Register in the Decoder, transmitting the result to the Output Register.
- (5) Develop the logical sum of the contents of the Input Register and the contents of the Output Register in the Encoder to control the inhibit lines.

(C) Read-Out Data Memory (01).
- (1) Set Control Register to 01.
- (2) Transfer the address word to the Data Memory Address Register and to the Input Register.
- (3) Activate the Data Memory.
- (4) Develop the logical sum of the word outputted from the Sense Amplifiers and the contents of the Input Register in the Decoder and transmit the result to the Output Register.
- (5) Develop the logical sum of the contents of the Input Register and the contents of the Output Register in the Encoder to control the inhibit lines.

Referring now to the figure, assume that control word 11 is placed in the Control Register 42 from external means not shown. Further, assume that from additional external means not shown a twelve-bit data word is placed on line 72 and a twelve-bit address word is placed on line 74. The internal circuitry of the Control Register translates the two-bit control word to place an activating signal on line 46. This signal passes through OR circuit 58 and enables the twelve AND circuits at 70 to allow the signal manifestations of the address word on line 74 to be transferred to the Data Memory Address Register 28 and to the Input Register 82 through OR circuit 84. In a similar manner, this same signal on line 46 is applied as an enabling input to the twelve AND circuits at 66 to allow the signal manifestations of the data word on line 72 to be transferred to the Address Memory Address Register 26 and to the Output Register 78 via OR circuit 80. This same Control Register output signal passes through OR circuits 54 and 56 as an enabling input to AND circuits 62 and 64, respectively. At a predetermined time, the second input to these latter AND circuits, labelled "*t*," receive signals which activate the Read/Write circuits 34 of the Address and Data Memory, 10 and 12, respectively. This initiates the memory reference cycles of both of these memories and, in a manner previously described, the X and Y translation of the contents of the respective Address Registers causes the information stored in one of the 4,096 addressable memory registers to be read-out and transmitted via the respective Sense Lines 22 to the Sense Amplifiers 36. Since this is a write mode of operation, the information read-out is of no consequence so even though there occurs a mixture of signals applied to the Sense Amplifiers these signals are lost since the twelve AND circuits at 76 which gate the output of the Sense Amplifiers are not enabled.

Substantially concurrently with the foregoing, the contents of the Input Register 82, which in this instance is the address word, is combined with the contents of the Output Register 78, which is the data word, in the Encoder 88 to develop signal manifestations of the logical sum of the two words. The latter is transmitted to the Inhibit circuit 38 and in turn is applied to the Inhibit Lines of both the Data and Address Memories. During the restore step of the memory reference cycle, information is written into the same memory storage registers previously selected and the Inhibit Line signals to the respective memories control the writing of a binary "1" or binary "0" in each of the respective stages of said memory storage registers. In this manner then, the logical sum of the data word and address word is stored in the Address Memory at a location designated by the data word and in the Data Memory at an address designated by the address word.

The Read-Out Address Memory mode of operation is initiated by the receipt of control word 10 by the Control Register. It will be assumed that a twelve-bit data word is present on line 72. The Control Register, in translating the control word, places an activating signal on line 48 which enables the twelve AND circuits at 68 to allow the data word to be transferred to the Address Memory Address Register 26 and to the Input Register 82. Additionally, the signal from line 48 passes through OR circuit 56 to enable AND circuit 64, and the latter provides a signal to activate the Read/Write circuitry of the Address Memory upon occurrence of a signal at the "*t*" input. The signal from line 48 also passes through OR circuit 52 to provide an enabling signal input to AND circuit 60 which, at the proper time, also receives a signal at input "*t*" to develop an output signal which serves as an enabling input to the twelve AND circuits at 76. The initiation of the Address Memory reference cycle results in the information stored at the location designated by the contents of the Address Memory Address Register, the data word, to be read-out and appear as an input to the twelve Sense Amplifiers, 36. The output of the latter passes through the enabled AND circuits at 76 into the Decoder 86. The Decoder combines the latter with the contents of the Input Register, the data word, to develop the logical sum which is then transmitted to the Output Register 78 via the OR circuit 80. As previously described, this output is now equal to the address word which had been previously associated with the input data word and signal manifestations of this word are outputted to a utilization device as well as being outputted to the Encoder 88. The latter combines the data word from the Input Register with the address word from the Output Register to develop the logical sum thereof to control the Inhibit circuit 38 and the associated Inhibit Lines. The latter in turn cause this logical sum to be restored in the Address Memory at the same address from which it had been read-out. In this manner, it can be seen, an address word associated with a known data word can be determined when only the latter is known.

The third mode of operation, Read-Out Data Memory, is initiated by the receipt by the Control Register of control word 01 with a twelve-bit address word present on line 74. The Control Register translation results in an activating signal on line 50 which passes through OR circuit 58 to enable the twelve AND circuits at 70 to transfer the address word to the Data Memory Address Register 28 and to the Input Register 82. The signal from line 50 also passes through OR 54 to serve as an enabling input to AND 62 which, upon receipt of a signal at the appropriate time at input "*t*", activates the Read/Write circuitry of the Data Memory. The signal from line 50 also passes through OR 52 to provide an enabling input to AND 60 which in turn provides an enabling input to the twelve AND circuits at 76 upon the occurrence of an appropriately timed input at "*t*". During the read step of the memory reference cycle of the Data Memory, the information stored at the location designated by the address word in the Data Memory Address Register is read-out and appears on the Sense Lines and at the input to the Sense Amplifiers. The output of the latter passes through the enabled gates at 76 into the Decoder where they are combined with the address word in the Input Register to develop the logical sum of the two. The latter, in this instance, is the data word associated with this particular address word and is transmitted to the Output Register and from there as an output to the utilization device and as an input to the Encoder. The latter combines this with the address word from the Input Register to develop the logical sum to control the Inhibit Lines once again. During the restore step of the Data Memory reference cycle, the Inhibit Lines cause the previously read-out logical sum to be restored at the same location from which it had been read-out. In this manner, knowing a particular address word the associated data word can be determined.

Although the embodiment of this invention has been described as used with a destructive read-out memory device, obviously it could be utilized with a non-destructive read-out memory device. In the latter, as is well known, during the read-out mode of operation no restore step is required and, therefore, the reformation of the read-out logical sum need not be done.

It should be noted that if it is desired to associate a single data word with a plurality of different address words, this can be effected by a series of write modes of operation while holding the data word constant and changing the address word for each of the respective write modes. Subsequent read-out and decoding of the Data Memory information from addresses designated by any of these address words will provide the same data word while subsequent read-out and decoding of the Address Memory information from a location designated by this data word will provide the last-in-time address word associated with this data word. Similarly, a single address word can be associated with a plurality of different data words by undergoing a series of write modes while holding the address word constant and changing the data word accordingly for each of the respective write modes. Subsequent read-out and decoding of the Address Memory information from an address designated by any of these data words will provide the single address word whereas subsequent read-out and decoding of the Data Memory information from an address designated by the address word will provide the last-in-time data word associated with this address word.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. In combination:

memory apparatus comprising a plurality of independently accessible addressable storage registers, said memory apparatus including addressing means for accessing selected ones of said addressable storage locations;

receiving means for receiving manifestations of first and second binary-coded words, each of said words indicative at least in part of an address to be accessed in said memory apparatus, said receiving means coupled to said addressing means;

logical summing means coupled to said receiving means for combining the manifestations of said first and second words to provide manifestations of the logical sum thereof;

and control means coupled to said logical summing means and said memory apparatus for storing the manifestations of the logical sum in said memory apparatus at a storage register address defined by the manifestations of said first word and at storage register address defined by the manifestations of said second word.

2. The combination of claim 1 and further including selectively actuatable read-out control means coupled to said memory apparatus and to said receiving means for alternatively reading out the stored manifestations from an addressable storage register defined by the manifestations of a selected one of said first and second words received by said receiving means; and further logical summing means coupled to said read-out control means for receiving and forming the logical sum said read-out manifestations and the manifestations of said selected one of said words for providing manifestations of the othei of said words.

3. Memory apparatus for a binary computing device comprising, in combination:

memory apparatus comprising a plurality of independently accessible addressable storage registers, said memory apparatus including addressing means for accessing selected ones of said addressable storage locations;

receiving means for receiving a binary-coded word having an address-representing portion and a data-representing portion, said receiving means coupled to said addressing means;

logical summing means coupled to said receiving means for forming the logical sum of said two portions;

storing means coupled to said receiving means and said forming means for storing said logical sum at memory addresses defined by each of said word portions;

reading means coupled to said storing means for reading out the stored logical sum from a memory address defined by a selected one of said word portions;

and output means for logically summing said logical sum with said one word portion to provide the other word portion.

4. For a binary computer, in combination:

first and second memory apparatus each including an address register and selectively energizable means for storing in and reading-out from addressable memory registers binary-coded information, the addresses of said memory registers being defined by the contents of the respective address registers;

means for receiving a binary-coded word having first and second portions;

control means coupled to said first and second memory apparatus and said receiving means for providing energizing signals to said memory apparatus, respectively, to (a) store information in both memory apparatus, (b) read out information from the first memory apparatus, (c) read out information from the second memory apparatus;

said control means comprising:

first gating means coupled to said receiving means and said first and second memory apparatus and responsive in part to control signal (a) for transmitting the first and second word-portions from said receiving means, respectively, to the address registers of said first and second memory apparatus;

means coupled to said first gating means and said first and second memory apparatus and responsive in part to control signal (a) for developing the logical sum of the first and second word-portions and for transmitting and storing said logical sum in said first and second memory apparatus;

second gating means coupled to said receiving means and said first memory apparatus and responsive in part to control signal (b) for transmitting the first word-portion from said receiving means to the address register of the first memory apparatus;

means coupled to said second gating means and said first memory apparatus and responsive in part to control signal (b) for developing the logical sum of the information read out from the first memory apparatus and the transmitted first word-portion;

third gating means coupled to said receiving means and said second memory apparatus and responsive in part to control signal (c) for transmitting the second word-portion from said receiving means to the address register of the second memory apparatus;

and means coupled to said third gating means and said second memory apparatus and responsive in part to control signal (c) for developing the logical sum of the information read out from the second memory apparatus and the transmitted second word-portion.

5. Memory apparatus for use in a binary computer having in combination: first and second memory apparatus each including an address register and selectively energizable means for storing in addressable memory registers binary coded information, the addresses of said memory registers being defined by the contents of the respective address registers; means for receiving a binary coded word having first and second portions; control means coupled to said first and second memory apparatus and said receiving means for providing energizing control signals to said memory apparatus for storing information in said first and second memory apparatus, said control means including first gating means coupled to said receiving means and said first and second memory apparatus and responsive in part to said control signal for transmitting the first and second word portions from said receiving means, to said address registers of said first and second memory apparatus respectively, means coupled to said first gating means and said first and second memory apparatus and responsive in part to said control signal for developing the logical sum of the first and second word portions and for transmitting and storing said logical sum in said first and second memory apparatus at addressable locations respectively defined by said first and second portions stored in said address registers.

No references cited.

ROBERT C. BAILEY, *Primary Examiner.*

P. J. HENON, *Assistant Examiner.*